United States Patent
Suzuki et al.

(10) Patent No.: US 6,931,177 B2
(45) Date of Patent: Aug. 16, 2005

(54) OPTICAL FIBER ARRAY WITH LENSES

(75) Inventors: Masaru Suzuki, Mohka (JP); Masahiro Ao, Tochigi (JP)

(73) Assignee: Hitachi Metals, Ltd., Tokyo (JP)

( * ) Notice: Subject to any disclaimer, the term of this patent is extended or adjusted under 35 U.S.C. 154(b) by 191 days.

(21) Appl. No.: 10/341,409

(22) Filed: Jan. 14, 2003

(65) Prior Publication Data

US 2003/0142909 A1 Jul. 31, 2003

(30) Foreign Application Priority Data

Jan. 25, 2002 (JP) .................................... 2002-017369

(51) Int. Cl.$^7$ .............................................. G02B 6/32
(52) U.S. Cl. ..................................... 385/33; 385/137
(58) Field of Search ............................. 385/33, 137

(56) References Cited

U.S. PATENT DOCUMENTS

| | | | | |
|---|---|---|---|---|
| 4,812,002 A | * | 3/1989 | Kato et al. ..................... 385/33 |
| 5,281,301 A | | 1/1994 | Basavanhally | |
| 5,346,583 A | * | 9/1994 | Basavanhally ............... 216/26 |
| 5,384,885 A | * | 1/1995 | Diner ......................... 385/140 |
| 6,137,930 A | * | 10/2000 | Laughlin ..................... 385/34 |
| 6,143,382 A | | 11/2000 | Koyama et al. | |
| 6,220,058 B1 | | 4/2001 | Koyama et al. | |
| 6,328,482 B1 | * | 12/2001 | Jian ........................... 385/88 |
| 6,522,817 B2 | * | 2/2003 | Moran ........................ 385/120 |
| 6,766,076 B2 | * | 7/2004 | Nakama et al. ............... 385/33 |
| 6,766,085 B2 | * | 7/2004 | Fouquet et al. ............... 385/52 |

| | | | | |
|---|---|---|---|---|
| 2001/0051028 A1 | * | 12/2001 | Gutierrez et al. ............. 385/85 |
| 2003/0068153 A1 | * | 4/2003 | Suzuki ....................... 385/137 |

FOREIGN PATENT DOCUMENTS

| | | |
|---|---|---|
| JP | 58-134613 | 8/1983 |
| JP | 4-288507 | 10/1992 |
| JP | 9-90162 | 4/1997 |

* cited by examiner

*Primary Examiner*—Rodney Bovernick
*Assistant Examiner*—Mike Stahl
(74) *Attorney, Agent, or Firm*—Sughrue Mion, PLLC

(57) ABSTRACT

An optical fiber array with lenses connected with a plurality of optical fibers is disclosed, enabling to be manufactured to meet the optical fiber end intervals to the terminal intervals of an optical device to be connected and having an improved efficiency in connection operation. The optical fiber array comprises a base plate having a first end surface and a second end surface opposite to the first end surface, a plurality of optical fibers having a tip surface inserted and secured in each of the holes opened on the base plate, and a plurality of collimator lenses installed on the second end surface facing the tip surfaces of the optical fiber. Each hole has a tapered inside wall having a diameter gradually decreasing from an opening on the first end surface of the base plate toward the second end surface and a parallel inside wall continuing from the tapered inside wall end. In the hole, a refraction index matching agent is preferably filled in between the tip surface of the optical fiber and the collimator lens. The optical fiber array is designed so as to match the optical axis pitches of the optical fibers and collimator lenses to the terminal pitches of the optical device to be connected.

7 Claims, 8 Drawing Sheets

OPTICAL FIBER ARRAY WITH LENSES

BACKGROUND OF THE INVENTION

1. Field of the Invention

The present invention relates to an optical fiber array with lenses used in a field of optical communication.

2. Description of the Related Art

In recent years, technological innovation has been significant in information communication. To accommodate an increased communication speed and an increased amount of information communicated resulting from the spread of an Internet, communication has been shifting from the reliance on electric signals to the use of optical signals. More and more traditional cables, which were used as essential elements of many networks, have been replaced with optical ones because information from various relay points is gathered at the cables. Accordingly, the processing speed has been substantially improved. However, the communication between optical cables and user terminals is expected to be reviewed because there have been more and more exacting demands for the establishment of more inexpensive and comfortable information communication environments.

As the establishment of optical communication networks makes gradual progress, information is transmitted at higher speed. Correspondingly, more and more new applications are created. Furthermore, the amount of information communicated over the optical communication networks increases. To increase the amount of information that can be processed with optical fibers, high-frequency signals are used in order to increase the amount of signals available per unit time. Further, for the same purpose, a technology called a "wavelength division multiplex method" is used in which signals of a large number of wavelengths with different pieces of information are simultaneously transmitted through a single optical fiber. However, a large number of optical fibers must be used for communication involving an enormous amount of information that cannot be processed by the wavelength division multiplex method. Further, to form an elaborate and reliable communication network, it is necessary to establish connections to multiple paths in multiple directions. Thus, the use of a plurality of optical fibers is also essential in connection with maintenance applications.

To form an optical circuit using a plurality of optical fibers, an optical fiber array with the optical fibers arranged parallel with each other is often used in order to facilitate assembly operations. The use of an optical fiber array allows a plurality of optical fibers to be handled easily at a time, thus allowing connection operations to be performed more efficiently.

When an optical signal propagated through an optical fiber is emitted from an end of the optical fiber into a medium such as air or a liquid which has a refraction index different from that of the optical fiber, a light beam is spread. The spread of the light beam increases consistently with distance over which the signal propagates through the medium. Consequently, a propagation loss occurs when the optical signal is connected to a light beam path such as another optical fiber. A collimator lens is used to prevent the spread of the light beam. Optimizing the refraction index of the lens allows the light beam emitted from the optical fiber end to advance without being spread.

With an optical fiber array with lenses, a pitch interval must be matched between the arrangement of optical fibers and the arrangement of lenses. That is, the distance between the optical fibers arranged in an array must be equal to the pitch interval of the lenses. Further, to prevent the size of the circuit from being increased even with a plurality of optical fibers connected to each optical device part, the pitch of an optical path must be matched between the optical fiber array, in which the plurality of optical fibers are connected together, and the optical device part.

In an optical fiber array used to connect a plurality of optical fibers together, the connection pitch of the optical fibers is normally determined by their diameter. FIG. 9 is a sectional view of four optical fibers arranged parallel with one another. In this figure, a core 91 of each optical fiber 90 has a diameter of about 10 micrometers. A clad 92 is provided around the core 91. A coating 93 is provided around the outer periphery of the clad 92. An optical fiber array used to connect the plurality of optical fibers 90 together has an I/O terminal pitch equal to the pitch between the plurality of optical fibers bundled as shown in the figure. The coating 93 of the optical fiber has a diameter of about 250 micrometers, so that the I/O terminal pitch of the optical fiber array is about 250 micrometers. To change the I/O terminal pitch of the optical fiber array, the thickness of the coating 93 must be increased with the diameter of the optical fiber itself increased. Accordingly, it is very difficult to make an optical fiber array if the array comprises optical fiber I/O terminals each composed of multiple stages so that the vertical pitch of the array is different from its horizontal pitch or that the array has various pitches including larger and smaller ones.

SUMMARY OF THE INVENTION

It is thus an object of the present invention to provide an optical fiber array with lenses which allows the interval between optical fiber ends to equal the terminal interval of equipment to connect to and which allows connection operations to be performed more efficiently.

An optical fiber array with lenses according to the present invention has a base plate having a first end surface and a second end surface opposite to the first end surface, a plurality of optical fibers each inserted into a corresponding one of a plurality of holes opened in the base plate, the optical fibers each being secured in the corresponding hole, and a plurality of collimator lenses each installed on the second end surface of the base plate to face a tip surface of the corresponding optical fiber.

The base plate of the optical fiber array with lenses may have a plurality of openings arranged on the first end surface and a plurality of through-holes each opened from each of the openings to the second end surface. Each of the through-holes may have an opening on the second end surface with a diameter smaller than that of the opening on the first end surface and a tapered inside wall whose diameter gradually decreases from the opening on the first end surface to an end of the tapered inside wall.

Each of the optical fibers has a tip surface that is inserted into each of the through-holes of the base plate toward the opening on the second end surface through the opening on the first end surface and secured in each of the through-holes. Each of the optical fibers extends to the exterior of the base plate through the opening on the first end surface. Each of the collimator lenses is installed on each of the openings on the second end surface of the base plate to face the tip surface of each of the optical fibers.

The plurality of openings on the first end surface are arranged so that the openings and collimator lenses on the second end surface match corresponding connection terminals of an optical device to be connected to the optical fiber array with lenses according to the present invention, i.e. an optical axis of the connection terminal.

In the optical fiber array with lenses according to the present invention, each of the through-holes preferably has the tapered inside wall and a parallel inside wall that has a uniform diameter between the end of the tapered inside wall and the opening on the second end surface. Preferably, the diameter of the parallel inside wall is 0.5 to 5 micrometers larger than a diameter of the optical fiber. The parallel inside wall need not be present between the end of the tapered inside wall and the opening on the second end surface, and a thinner end of a tapered hole may constitute the opening on the second end surface. Preferably, the opening on the second end surface located at the thinner end of the tapered hole is 0.5 to 5 micrometers larger than the diameter of the optical fiber. When the diameter of the parallel inside wall or the diameter of the thinner-side opening of the tapered hole located on the second end surface is thus 0.5 to 5 micrometers larger than the diameter of the optical fiber, the tip of the optical fiber can reach the opening on the second end surface easily. Furthermore, an adhesive or a refraction index matching agent can be filled easily between the optical fiber and the inside wall of the through-hole. When the diameter of the opening of the through-hole located on the second end surface is less than 0.5 micrometer larger than the diameter of the optical fiber, the tip of the optical fiber may fail to reach the opening on the second end surface. In some cases, when the refraction index matching agent is filled into the through-hole, it does not reach the tip of the optical fiber. As a result, bubbles may remain between the tip surface of the optical fiber and the collimator lens. On the contrary, when the diameter of the opening of the through-hole located on the second end surface is 5 micrometers or more larger than the diameter of the optical fiber, then in the opening located on the second end surface, the area of that part of the adhesive may increase which is exposed between the opening end and the optical fiber. Accordingly, the adhesive may be raised from the opening or may be depressed. If the adhesive is raised from the opening, the distance between the tip surface of the optical fiber and the collimator lens may vary. If the adhesive may be depressed, when the second end surface is polished, the tip surface of the optical fiber may be polished together. Consequently, surface roll over may occur.

The tapered inside wall of the through-hole located near the first end surface is preferably tapered at an angle of 1 to 10 degrees with a center axis of the through-hole. When the tapered inside wall is tapered at an angle of 1 degree or more, the tip of the optical fiber can be inserted into the through-hole from the opening on the first end surface so as to reach the opening on the second end surface. Further, since the inside wall is tapered, an adhesive or a refraction index matching agent can be filled easily between the inside wall of the through-hole and the optical fiber from the opening on the first end surface. When the tapered inside wall is tapered at an angle of 10 degrees or more, a larger amount of adhesive or refraction index matching agent is filled between the inside wall of the through-hole and the optical fiber. Accordingly, stress exerted by the adhesive may change the characteristics of the optical fiber.

According to the present invention, the through-hole between the first end surface and second end surface of the base plate can be composed of a plurality of contiguous tapered holes whose angle with a center axis of taper of the tapered inside wall gradually decreases from the opening on the first end surface to the inside of the optical fiber array. Alternatively, a parallel hole may be formed between the tapered holes. Alternatively, the through-hole may have a radius of curvature with respect to the center axis so that its diameter decreases from the first end surface to the inside of the optical fiber array.

Preferably, the tip surface of each of the optical fibers used in the present invention is tilted at an angle of 3 to 10 degrees with an optical axis of the optical fiber. When the tip surface of the optical fiber is tilted at an angle of 3 to 10 degrees from the optical axis of the fiber, the reflection of optical signals from the tip surface of the optical fiber is negligible. Preferably, the adhesive used in the present invention is a refraction index matching agent. Preferably, the refraction index matching agent is filled between the tip surface of the optical fiber and the collimator lens.

If a base plate used in the present invention is made of a light transparent material and if the base plate is made of material such as silicon which allows optical signals to pass through, then it may have a plurality of holes each opened from each of a plurality of openings arranged on a first end surface of the base plate instead of a plurality of through-holes opened in the base plate, toward a second end surface, the holes each having a bottom adjacent to the second end surface with a diameter smaller than that of the opening on the first end surface. The hole has a tapered inside wall whose diameter gradually decreases from the opening on the first end surface of the base plate to an end of the tapered inside wall. Preferably, each hole has a parallel inside wall having a uniform diameter between the end of the tapered inside wall and the hole. Preferably, each optical fiber has a tip surface that is inserted through the opening of each of the holes on the first end surface toward or to the bottom and secured in the hole. Preferably, the optical fiber extends to the exterior of the base plate through the opening on the first end surface. Collimator lenses are each installed on the second end surface of the base plate to face the tip surface of each of the optical fibers.

The distance between the tip surface of the optical fiber and the corresponding collimator lens must be such that an optical signal emitted from the tip surface of the optical fiber is changed into a parallel light beam by the collimator lens. When a partition wall has an appropriate thickness, the partition wall constituting that part of the base plate which is located between the bottom of the hole opened in the base plate, composed of a light transparent material, and the collimator lens provided on the second end surface, then a stable and appropriate distance can be set between the tip surface of the optical fiber and the collimator lens by securing the tip surface so as to coincide with the position of bottom of each hole.

When the tip of the optical fiber is inserted into the hole with the bottom, the tapered inside wall is preferably tapered at an angle of 3 to 15 degrees. Preferably, the diameter of the parallel inside wall is 0.5 to 5 micrometers larger than a diameter of the optical fiber. Further, the tip surface of each of the optical fibers is preferably tilted at an angle of 3 to 10 degrees with an optical axis of the optical fiber. Preferably, a refraction index matching agent is filled between the tip surface of each of the optical fibers and the bottom.

DETAILED DESCRIPTION OF THE PREFERRED EMBODIMENTS

EXAMPLE 1

Figure 1:
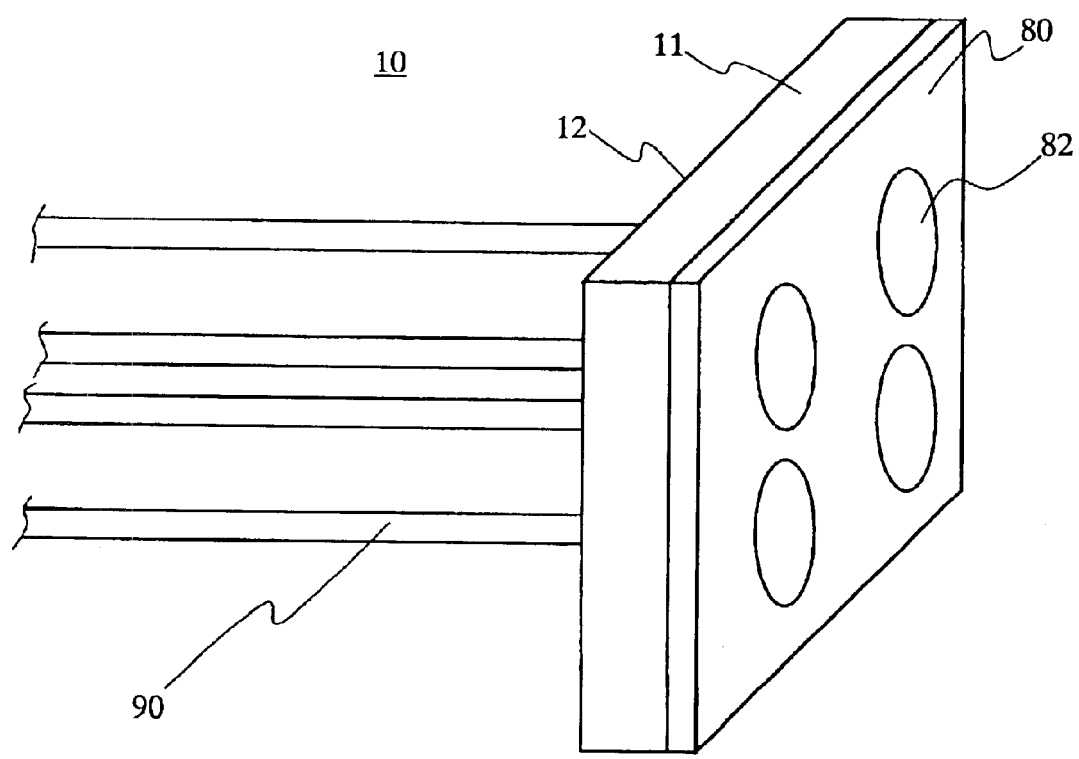
FIG. 1 is a perspective view, viewed on a collimator lens side, of an optical fiber array with lenses of EXAMPLE 1 according to the invention.
Figure 2:
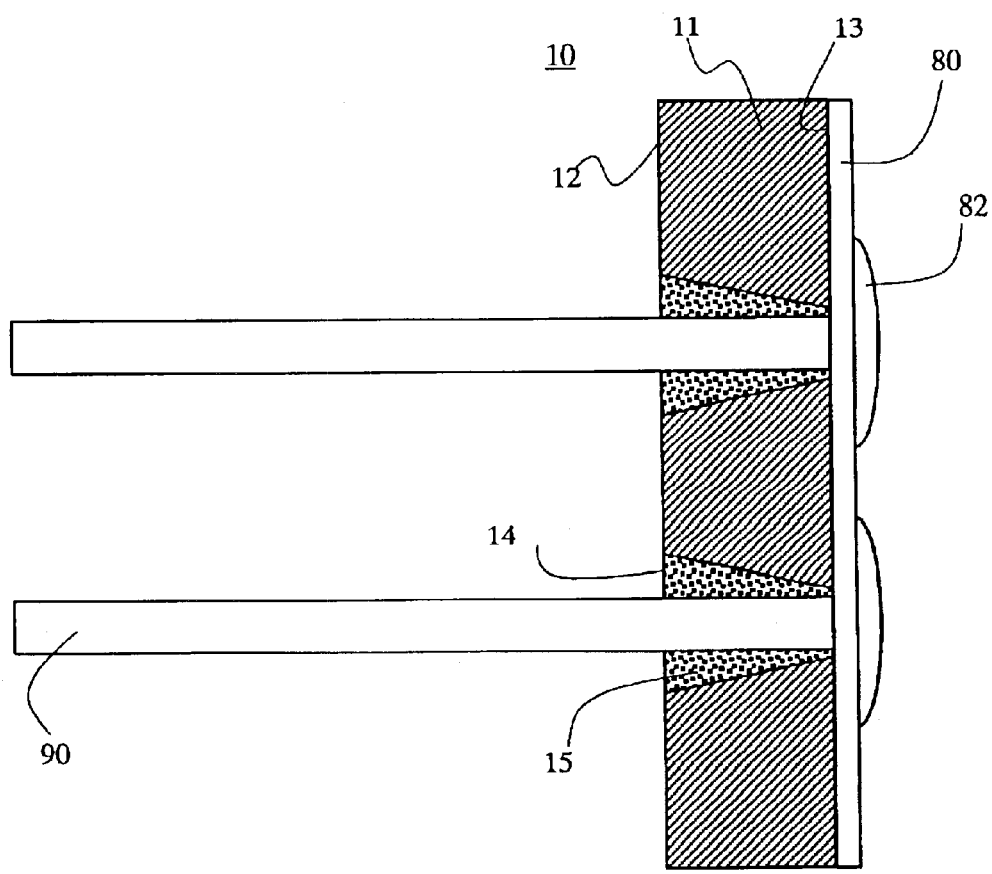
FIG. 2 is a cross section of the optical fiber array with lenses of EXAMPLE 1 along the line of tapered through-holes and optical fibers of the optical fiber array.

With reference to FIGS. 1 and 2, description will be given of an optical fiber array with lenses 10 according to EXAMPLE 1 of the present invention. FIG. 1 is a perspective view, viewed on a collimator lens side, of the optical fiber array with lenses 10. FIG. 2 is a cross section of the optical fiber array with lenses 10 along the line of tapered through-holes and optical fibers of the optical fiber array. The optical fiber array with lenses 10 has four optical fibers with lenses 90 arranged in two stages and two rows. The arrangement pitch in the vertical direction of the optical fibers with lenses is different from that in the horizontal direction of these fibers. A base plate 11 has a first end surface 12 and a second end surface 13 opposite to the first end surface 12. The first end surface 12 is parallel with the second end surface 13. The base plate 11 has openings 14 arranged on the first end surface 12 and through-holes 15 each opened from the corresponding opening 14 to the second end surface 13. Each of the through-holes 15 has an opening on the second end surface and having a smaller diameter than that of the opening 14 on the first end surface, and a tapered inside wall the diameter of which gradually decreases from the opening 14 on the first end surface to the opening on the second end surface. The tapered inside wall of the through-hole 15 is tapered at an angle of about 5 degrees with the center axis of the through-hole. The tapered through-hole 15 has a diameter of 427 micrometers at the opening 14 on the first end surface and a diameter of 252 micrometers at the opening of the deepest portion, which contacts with a collimator lens 82. The optical fibers 90 have a diameter of 250 micrometers. The base plate 11 has a thickness of 1 millimeter. The optical fiber pitch is 750 micrometers in the vertical direction and 1 millimeter in the horizontal direction.

Each optical fiber 90 is inserted into the corresponding tapered through-hole 15, formed in the base plate 11, from the corresponding opening 14 on the first end surface to the corresponding opening on the second end surface. The optical fiber 90 is then secured in the through-hole. The collimator lens 82 is attached to each opening on the second end surface so as to lie opposite a tip surface of the optical fiber inserted and secured in the through-hole and to have its optical axis coincide with the optical axis of the optical fiber. These collimator lenses 82 constitute a microlens array 80 in which the surfaces of plates made of silicon, glass, or the like are curved to form microlenses. The collimator lenses on the microlens array 80 are arranged so as to coincide with the tip surfaces of the corresponding optical fibers inserted and secured in the base plate 11. Accordingly, the microlens array 80 can be stuck to the second end surface 13 of the base plate for assembly. The microlens array may be constructed using collimator lens formed of glass plates having a partially altered refraction index distribution instead of the lenses with a changed surface radius of curvature.

After the optical fiber 90 has been inserted and secured in the through-hole 15 in the base plate 11 and before the microlens array 80 is stuck to the second end surface 13, the tip surfaces of the optical fibers and the second end surface 13 can be made flush with each other by slightly polishing the second end surface 13. After the tip surfaces of the optical fibers and the second end surface 13 have been made flush with each other, an adhesive acting as a refraction index matching agent is preferably applied to the surface obtained. Then, the microlens array is preferably stuck and fixed to the surface. By filling the refraction index matching agent between the tip surface of the optical fiber and the corresponding collimator lens without forming any intervening air layers, the loss of optical signals can be reduced, which may occur between the tip surface and the collimator lens. Preferably, the adhesive is a binding chemical adhesive (GA700L/H, manufactured by NTT Advanced Technology). This adhesive is a liquid when applied but becomes a solid when irradiated with ultraviolet rays after application. Then, it acts as an adhesive and a refraction index matching agent.

The collimator lenses 82 of the optical fiber array with lenses 10 are arranged so as to match the optical axes of corresponding optical signal connection terminals of an optical device to be connected to the array 10. The axes of the optical fibers of the array 10 and corresponding collimator lenses match the corresponding connection terminals of the optical device to connect to. This facilitates connection operations.

Now, description will be given of a method of opening through-holes in the base plate 11 using the optical fiber array with lenses 10 according to the present invention. The base plate 11 was composed of silicon. This is because rich process data on silicon has been accumulated owing to its wide use in manufacture of semiconductors and because silicon is easily available.

A spin coater was used to apply resist to the silicon base plate. Then, the base plate 11 was prebaked at 110 degrees centigrade for 30 minutes and then exposed to light of 2280 mJ/cm$^2$. Then, development was carried out for 7 minutes to produce a resist mask. The wall surface of the resist mask stands at an angle of about 90 degrees.

Dry etching based on reactive ion etching was used to form tapered through-holes. To form tapered holes, it is necessary to alternately repeat a process of forming holes by etching and a process of protecting the side walls of the holes. Further, the respective processes must be optimized. For the process of opening holes by etching, to set an etching speed for the base plate to be higher than an etching speed for the resist, that is, to increase a selection ratio to the resist a gas was used which was obtained by adding 26 ml/min of oxygen ($O_2$) to 260 ml/min of sulfur hexafluoride ($SF_6$). The pressure of the gas was set at 20 mTorr. Plasma power was set at 2,500 W. A bias power applied to the base plate was set at 10 W. The temperature of base plate electrodes was set at 10 degrees centigrade. For the process of protecting the side walls of the tapered through-holes, 180 ml/min of octafluorocyclobutane ($C_4F_8$) was used as a gas. The gas pressure was set at 20 mTorr. The plasma power was set at 2,500 W. The base plate bias power and the base plate electrode temperature were set at the same values as those used to form tapered through-holes. Octafluorocyclobutane has an annular structure, which is destroyed in plasma to become radicals. The radicals are polymerized to form polymers, which deposit on the side walls to protect them. Under these conditions, etching time was set at 8 seconds, and side wall protection time was set at 16 seconds. Then, a taper angle of 5 degrees could be formed.

When through-holes were formed, a dummy base plate was stuck to the lens mounted side of the base plate to prevent burrs from being formed at edges of the through-holes. If burrs are formed, when the collimator lenses 82 are stuck to the base plate 11, in which the through-holes have been opened, the optical axes of the optical fibers 90 may positionally deviate from those of the corresponding lenses 82. It has been confirmed that the use of the dummy plate prevents the formation of burrs. If possible burrs are negligible, the dummy plate need not be stuck.

EXAMPLE 2

Figure 3:
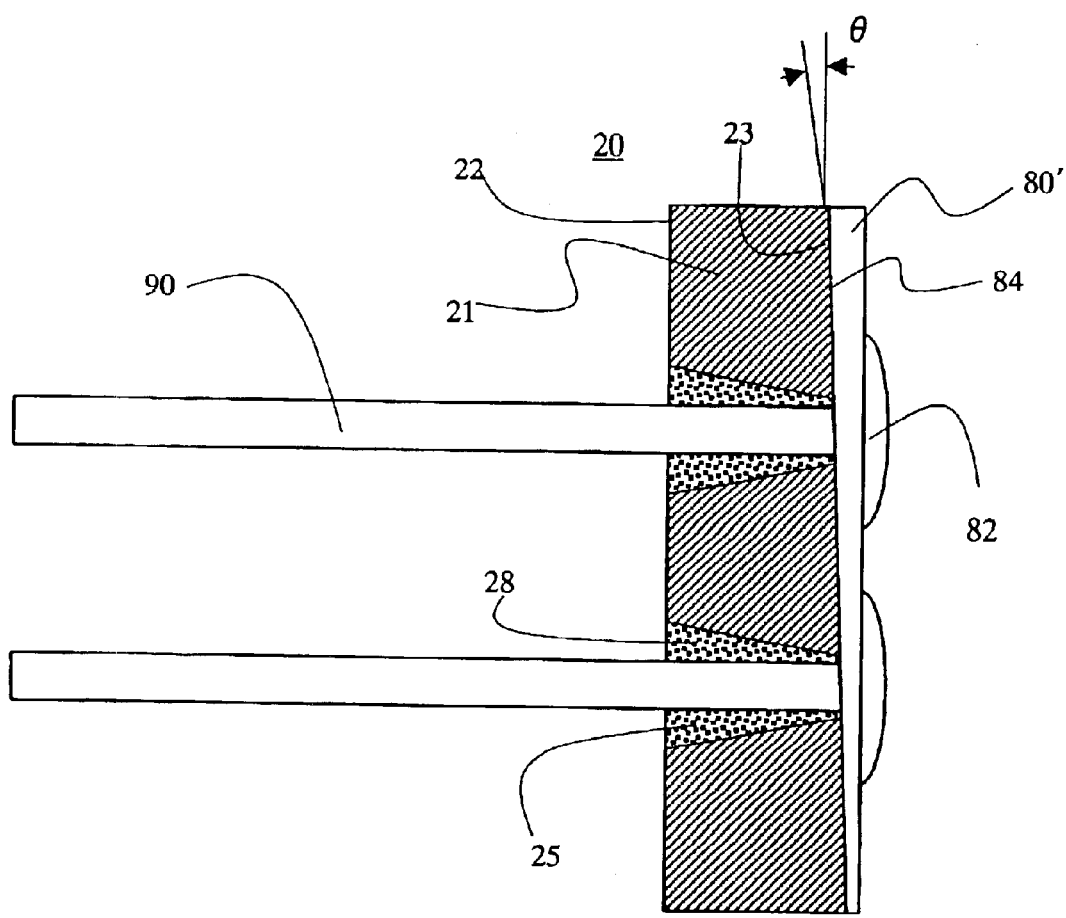
FIG. 3 is a cross section of the optical fiber array with lenses of EXAMPLE 2 along the line of tapered through-holes and optical fibers of the optical fiber array.

With reference to FIG. 3, description will be given of an optical fiber array with lenses 20 according to EXAMPLE 2 of the present invention. FIG. 3 is a cross section of the optical fiber array with lenses along the line of tapered through-holes and optical fibers of the optical fiber array. In FIG. 3, the same parts as those in FIGS. 1 and 2 for EXAMPLE 1 are denoted by the same reference numerals. The optical fibers 90 are each inserted into a corresponding tapered through-hole 25 and are each then secured in the tapered through-hole using a refraction index matching agent 28. Both a second end surface 23 of a base plate 21 and an end surface 84 of a microlens array 80' are polished so that an angle θ is about 8 degrees with the optical axis of the optical fiber 90. Then, an end surface 84 of the microlens array 80' is joined to the second end surface 23 of the base plate 21 using a refraction index matching agent. Since the tip surface of each optical fiber is tilted at an angle of 8 degrees with the optical axis of the optical fiber, the reflection of optical signals can be suppressed. The tip surface of the optical fiber is tilted at an angle of 8 degrees, so that a reflection loss is –65 dB at the tip surface. Thus, the reflection loss decreases by 50 dB compared to the case in which the tip surface of the optical fiber is at a right angle.

EXAMPLE 3

Figure 4:
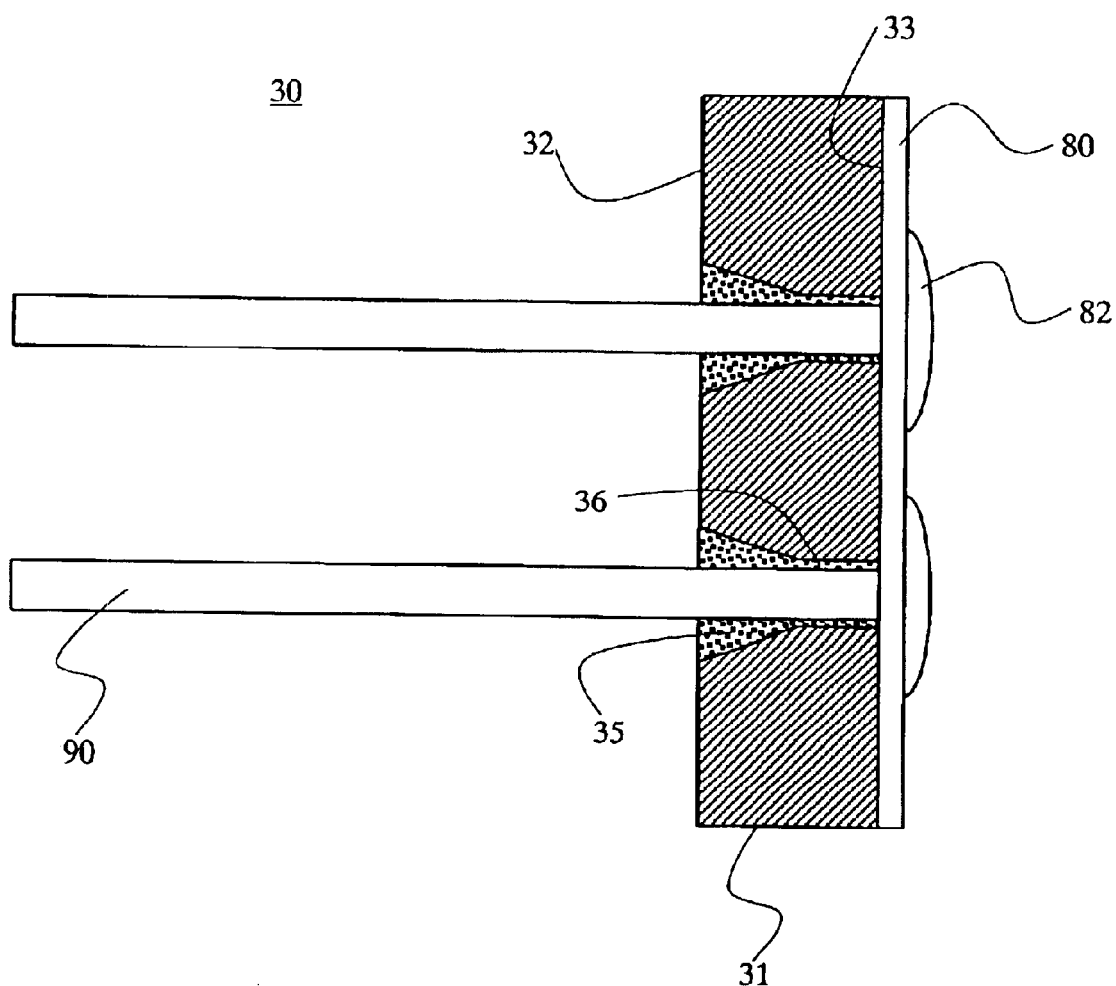
FIG. 4 is a cross section of the optical fiber array with lenses of EXAMPLE 3 along the line of through-holes and optical fibers of the optical fiber array.

With reference to FIG. 4, description will be given of an optical fiber array with lenses 30 according to EXAMPLE 3 of the present invention. FIG. 4 is a cross section of the optical fiber array with lenses along the line of tapered through-holes and optical fibers of the optical fiber array. In FIG. 4, the same parts as those in FIGS. 1 and 2 for EXAMPLE 1 are denoted by the same reference numerals. Through-holes are each formed from a corresponding one of the openings arranged on a first end surface 32 of a base plate 31, toward a second end surface 33. The through-hole is composed of a tapered hole 35 having a tapered inside wall extending toward the second end surface and a parallel hole 36 having a parallel inside wall formed between an end of the tapered inside wall and the opening on the second end surface 33 and having a uniform diameter. The microlens array 80, which has the plurality of collimator lenses 82, is secured on the second end surface 33 of the base plate 31 so that each of the collimator lenses 82 is opposite the tip surface of the corresponding optical fiber 90 inserted and secured in the corresponding through-hole in the base plate 31. A refraction index matching agent acting as an adhesive is filled into the tapered hole 35 and the parallel hole 36 between the walls of these holes and the optical fiber 90 and between the tip surface of the optical fiber 90 and the collimator lens 82.

The base plate 31 was 2.5 millimeters in thickness. The tapered hole 35 had a diameter of 427 micrometers at the opening on the first end surface and a taper angle of 5 degrees. The depth of the tapered hole 35 down to the end of the tapered inside wall is about 1 millimeter. The diameter of the tapered hole 35 was 252 micrometers at the end of the tapered inside wall. The parallel hole 36 had a length of about 1.5 millimeters.

The process described in EXAMPLE 1 was used to form through-holes. The parallel holes 36 were opened after the tapered holes 35 by forming a new resist mask so that each of the parallel holes 36 has the same center axis as the corresponding already opened tapered hole 35 and carrying out dry etching using a different value, compared to the formation of the tapered holes, for the ratio of the time for the process for protecting the side walls to the time for opening parallel holes by etching. The etching time was set at 8 seconds, and the side wall protection time was set at 12 seconds. Further, the detailed conditions for these processes were the same as those used in forming the tapered holes. When dry etching was carried out in this manner, parallel holes with parallel wall surfaces could be formed.

EXAMPLE 4

Figure 5:
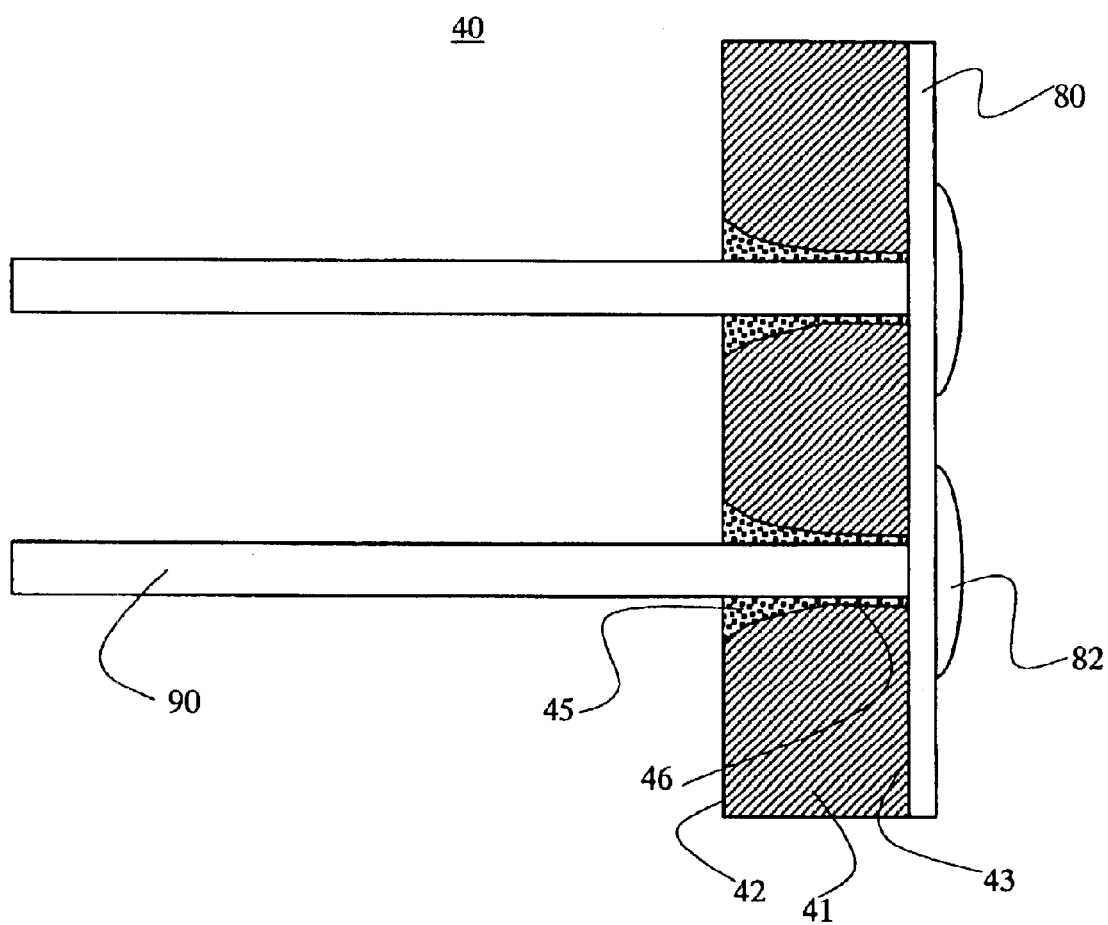
FIG. 5 is a cross section of the optical fiber array with lenses of EXAMPLE 4 along the line of through-holes and optical fibers of the optical fiber array.

With reference to FIG. 5, description will be given of an optical fiber array with lenses 40 according to EXAMPLE 4 of the present invention. FIG. 5 is a cross section of the optical fiber array with lenses along the line of tapered through-holes and optical fibers of the optical fiber array. In FIG. 5, the same parts as those in FIGS. 1 and 2 for EXAMPLE 1 are denoted by the same reference numerals. Through-holes are each formed from a corresponding one of the openings arranged on a first end surface 42 of a base plate 41, toward a second end surface 43. The through-hole is composed of a tapered hole 45 having a tapered inside wall extending from the corresponding opening on the first end surface toward the second end surface 43 and a parallel hole 46 having a parallel inside wall formed between an end of the inside wall of the tapered hole 45 and the corresponding opening on the second end surface 43 and having a uniform diameter. The tapered inside wall of the tapered hole 45 has a taper angle continuously varying with a center axis of the through-hole. The microlens array 80, which has the plurality of collimator lenses 82, is secured on the second end surface 43 of the base plate 41 so that each of the collimator lenses 82 is opposite the tip surface of the corresponding optical fiber 90 inserted and secured in the corresponding through-hole in the base plate 41. A refraction index matching agent acting as an adhesive is filled into the tapered hole 45 and the parallel hole 46 between the walls of these holes and the optical fiber 90 and between the tip surface of the optical fiber 90 and the collimator lens 82. The dimensions of each part of the optical fiber array with lenses 40 according to EXAMPLE 4 are the same as those of the optical fiber array with lenses 30 according to EXAMPLE 3.

EXAMPLE 5

Figure 6:
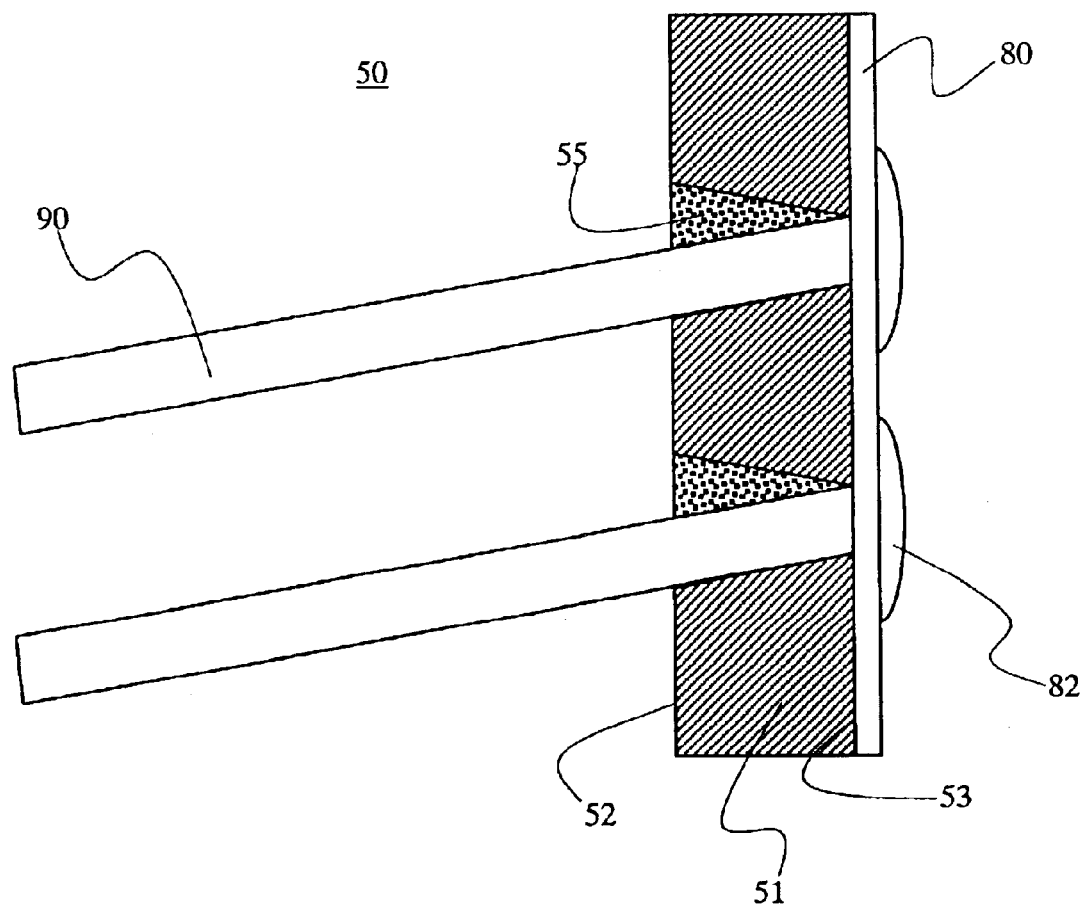
FIG. 6 is a cross section of the optical fiber array with lenses of EXAMPLE 5 along the line of tapered through-holes and optical fibers of the optical fiber array.

With reference to FIG. 6, description will be given of an optical fiber array with lenses 50 according to EXAMPLE 5 of the present invention. FIG. 6 is a cross section of the optical fiber array with lenses along the line of tapered through-holes and optical fibers of the optical fiber array. In FIG. 6, the same parts as those in FIGS. 1 and 2 for EXAMPLE 1 are denoted by the same reference numerals. Tapered through-holes 55 are each formed from a corresponding one of the openings arranged on a first end surface 52 of a base plate 51, toward a second end surface 53. The through-hole has a tapered inside wall tapered at an angle of 8 degrees with its center axis. Each of the optical fibers 90 is inserted into the corresponding through-hole 55 along the tapered inside wall of the through-hole 55 down to the second end surface 53. The optical fiber 90 is then polished so that the second end surface 53 of the base plate 51 is flush with the tip surface of the optical fiber 90. The tip surface of the optical fiber 90 is tilted at an angle of 8 degrees with the optical axis of the optical fiber 90. The microlens array 80, which has the plurality of collimator lenses 82, is secured on the second end surface 53 of the base plate 51 so that each of the collimator lenses 82 is opposite the tip surface of the corresponding optical fiber 90. A refraction index matching agent acting as an adhesive is filled between the wall of the tapered through-hole 55 and the optical fiber 90 and between the tip surface of the optical fiber 90 and the collimator lens 82. Since the tip surface of the optical fiber 90 is tilted at an angle of 8 degrees with the optical axis of the optical fiber 90, the reflection loss could be reduced down to −65 dB.

EXAMPLE 6

Figure 7:
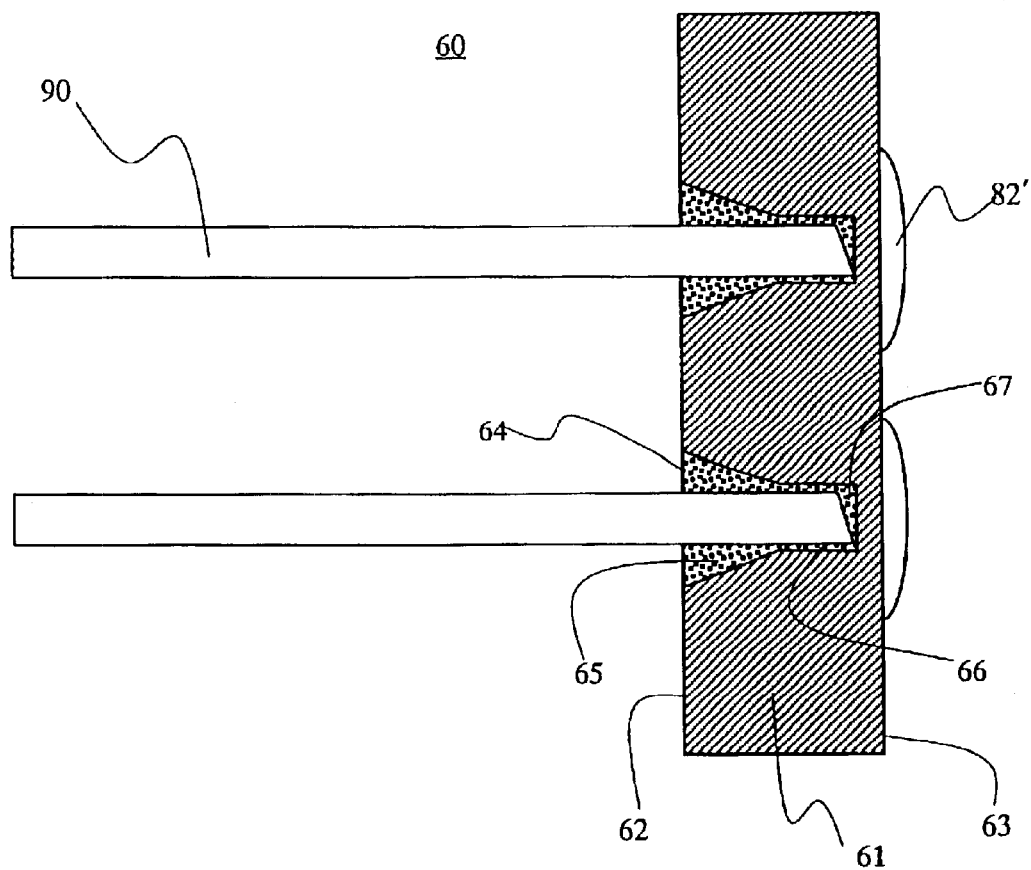
FIG. 7 is a cross section of the optical fiber array with lenses of EXAMPLE 6 along the line of holes and optical fibers of the optical fiber array.

With reference to FIG. 7, description will be given of an optical fiber array with lenses 60 according to EXAMPLE 6 of the present invention. FIG. 7 is a cross section of the optical fiber array with lenses along the line of holes and optical fibers of the optical fiber array. In FIG. 7, the same parts as those in FIGS. 1 and 2 for EXAMPLE 1 are denoted by the same reference numerals. A base plate 61 is made of silicon, which is transparent to light of wavelength 1400 to 1700 nanometers, which is used as an optical signal. The base plate 61 has a plurality of openings 64 arranged on a first end surface 62 and a plurality of holes each opened from the corresponding opening 64 to a second end surface 63 of the base plate. Each of the holes has a bottom 67 formed close to the second end surface and having a smaller diameter than the opening. The hole also has a tapered hole 65 the diameter of which gradually decreases from the corresponding opening on the first end surface 62 to an end of a corresponding tapered inside wall, and a parallel hole 66 formed between the end of the tapered inside wall and the bottom 67 and having a uniform diameter. The plurality of optical fibers 90 each have a tip surface that is inserted into the corresponding hole in the base plate 61 from the corresponding opening 64 down to the neighborhood of the corresponding bottom 67. The optical fiber 90 is then secured using a refraction index matching agent acting as an adhesive. The optical fiber extends to the exterior of the base plate 61 through the opening 64. The tip surface of the optical fiber is tilted at an angle of 8 degrees with the optical axis of the optical fiber. Collimator lenses 82' are each secured on the second end surface 63 of the base plate 61 so as to lie opposite the tip surface of the corresponding optical fiber 90 via the bottom wall of the corresponding hole opened in the base plate 61. A refractive index matching agent is filled between the tip surface of the optical fiber 90 and the bottom 67. The collimator lens 82' is stuck to the second end surface 63 of the base plate using the same refraction index matching agent. The refraction index matching agent used, i.e. an optical adhesive for coupling optical paths together, has substantially the same refraction index as that of an optical fiber core (1.449). Thus, although the tip surface of the optical fiber is tilted relative to the optical axis, no problems occur even if the optical axis of the optical fiber positionally deviates from the center line of the hole bottom 67 or the collimator lens 82'.

In the optical fiber array with lenses 60 according to EXAMPLE 6, the base plate has a thickness of 2 millimeters. The opening 64 on the first end surface has a diameter of 427 micrometers. The tapered hole 65 has a length of about 500 micrometers. The end of the tapered inside wall has a diameter of 252 micrometers. The tapered inside wall is tapered at an angle of about 10 degrees with the center axis of the hole. The parallel hole 66 has a length of about 1.3 millimeters. The bottom 67 has a diameter of 252 micrometers. The bottom wall has a thickness of 200 micrometers.

The tapered holes 65 and the parallel holes 66 were opened in the base plate 61 in a manner described below. A spin coater was used to apply resist to the silicon base plate. Then, the base plate was prebaked at 110 degrees centigrade for 30 minutes and then exposed to light of 2280 mJ/cm$^2$. Then, development was carried out for 7 minutes to produce a resist mask. Tapered holes 65 of 0.5 millimeter depth were formed by using dry etching based on reactive ion etching and comprising alternately repeating a process of forming the tapered holes 65 by etching and a process of protecting the side walls of the tapered holes. The etching time was set at 8 seconds, and the side wall protection time was set at 20 seconds. The holes 65 were formed to have a taper angle of 10 degrees.

Then, parallel holes 66 of 1.3 millimeters depth were formed so that their central axes coincide with those of the corresponding tapered holes 65. A resist mask was produced under the same conditions as those described above. To form the parallel holes 66, the dry etching based on reactive ion etching was also used which comprises alternately repeating a process of forming the parallel holes by etching and a process of protecting the side walls of the parallel holes. However, the etching time was set at 8 seconds, and the side wall protection time was set at 12 seconds.

EXAMPLE 7

Figure 8:
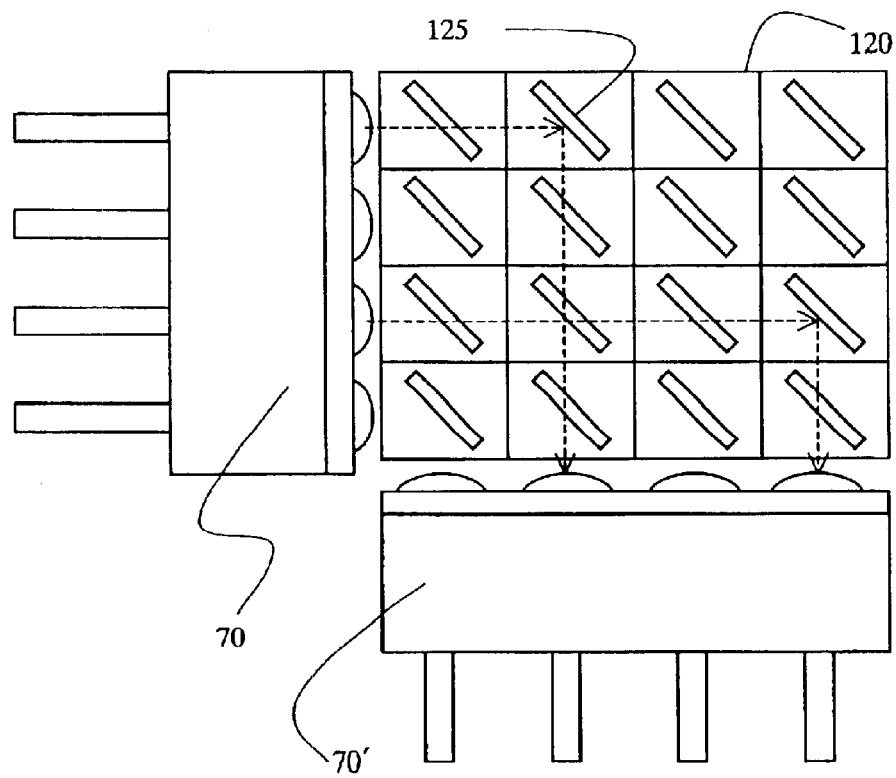
FIG. 8 shows an explanatory structure of 2-Dimensional Micro Electro Mechanical Systems using two sets of the optical fiber arrays with lenses according to the invention.
Figure 9:
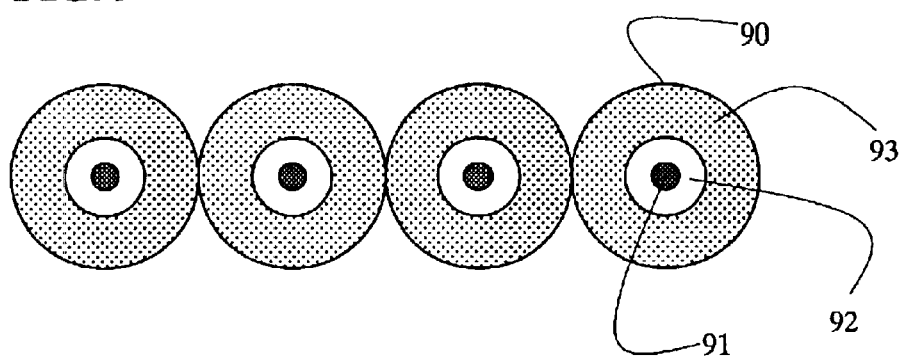
FIG. 9 shows a cross section of a bundle of optical fibers.

FIG. 8 shows an explanatory structure of a 2-Dimensional Micro Electro Mechanical Systems (simply referred to as "2-D MEMS") using two sets of the optical fiber arrays with lenses 70 and 70' according to the invention. A mirror matrix 120 has optical mirrors 125 arranged in a 4×4 matrix. The optical fiber arrays with lenses 70 and 70' are as shown in EXAMPLES 1 through 6. Each of these optical fiber arrays has four optical fibers as I/O terminals for optical signals and collimator lenses located opposite the tip surfaces of the corresponding optical fibers. Optical signals from the optical fiber array with lenses 70 are reflected by the corresponding optical mirrors 125 in the respective stages and then enter the corresponding optical fibers of the optical fiber array with lenses 70' via the corresponding collimator lenses. For the convenience of description, the optical mirrors 125 of the mirror matrix 120 are sequentially imparted with row numbers n starting with the leftmost row and with stage numbers m starting with the uppermost stage. Then, the optical mirror in the row n and stage m can be called an "optical mirror (n, m)". To guide an optical signal from the optical fiber in the uppermost stage of the optical fiber array with lenses 70, to the optical fiber in the row next to the leftmost row of the optical fiber array with lenses 70', the optical mirror (1, 1) of the mirror matrix 120 is made transparent, while the optical mirror (2, 1) is made reflective. If the optical mirrors (1, 3), (2, 3), and (3, 3) are made transparent and the optical mirror (4, 3) is made reflective, the optical fiber in the third stage from the uppermost one of the optical fiber array with lenses 70 is connected to the optical fiber in the fourth row from the leftmost one of the optical fiber array with lenses 70'. In this manner, with the 2-D MEMS, an optical fiber in one of the two sets of optical fiber arrays with lenses can be connected to an optical fiber in the other optical fiber arrays with lenses by switching the transparent and reflective states of the corresponding optical mirrors in the mirror matrix 120.

In general, in the 2-D MEMS, the intervals between the stages are not the same as the intervals between the rows. Thus, it is necessary to vary the optical axis pitch of the optical fiber array with lenses 70, connected to the respective stages of the mirror matrix, and the optical axis pitch of the optical fiber array with lenses 70', connected to the respective rows of the mirror matrix, so that the optical axes of the respective optical fibers match the optical axes of the corresponding stages of the mirror matrix and the optical axes of the corresponding rows of the mirror matrix. In the 2-D MEMS shown in FIG. 8, the optical axis pitch of the mirror matrix is 0.75 millimeter in the stage direction and 1.00 millimeter in the row direction. To match the optical axes, the optical fiber array with lenses 70 has an optical fiber pitch of 0.75 millimeter, whereas the optical fiber array with lenses 70' has an optical fiber pitch of 1.00 millimeter.

Thus, with the optical fiber array with lenses according to the present invention, the positions of the holes opened in the base plate of the optical fiber array can be determined according to the optical axis pitch of the optical device to be connected to the optical fiber array. Further, the collimator lenses can be mounted opposite the optical fibers inserted and secured in these holes. Therefore, the optical fiber array with lenses has an optical axis pitch matching that of the optical device to connect to and can thus be assembled easily on the optical device.

What is claimed is:

1. An optical fiber array with lenses comprising:
    a base plate having a first end surface and a second end surface opposite to the first end surface,
    the base plate having a plurality of openings arranged on the first end surface and a plurality of through-holes each opened from each of the openings to the second end surface,
    the through-holes each having an opening on the second end surface with a diameter smaller than that of the opening on the first end surface and a tapered inside wall whose diameter gradually decreases from the opening on the first end surface to an end of the tapered inside wall,
    a plurality of optical fibers each having a tip surface that is inserted into each of the through-holes in the base plate toward the opening on the second end surface through the opening on the first end surface and secured in each of the through-holes,
    the optical fibers each extending to the exterior of the base plate through the opening on the first end surface, and
    a plurality of collimator lenses each installed on each of the openings of the through-holes on the second end surface of the base plate to face the tip surface of each of the optical fibers,
    wherein the tapered inside wall is tapered at an angle of 1 to 10 degrees with a center axis of the through-hole.

2. An optical fiber array with lenses as set forth in claim 1, wherein each of the through-holes has the tapered inside wall and a parallel inside wall that has a uniform diameter between the end of the tapered inside wall and the opening on the second end surface.

3. An optical fiber array with lenses as set forth in claim 2, wherein the diameter of the parallel inside wall is 0.5 to 5 micrometers larger than a diameter of the optical fiber.

4. An optical fiber array with lenses as set forth in claim 1, wherein the tip surface of each of the optical fibers is tilted at an angle of 3 to 10 degrees with an optical axis of the optical fiber.

5. An optical fiber array with lenses as set forth in claim 1, wherein a refraction index matching agent is filled between the tip surface of each of the optical fibers inserted into each of the through-holes and the collimator lens.

6. An optical fiber array with lenses as set forth in claim 1, wherein a refraction index matching agent is filled between the optical fiber in the through-hole and the inside wall of the through-hole and between the tip surface of the optical fiber and the collimator lens and secures each of the optical fibers in the through-hole.

7. An optical fiber array with lenses comprising:
    a base plate having a first end surface and a second end surface opposite to the first end surface,
    the base plate having a plurality of openings arranged on the first end surface and a plurality of through-holes each opened from each of the openings to the second end surface,
    the through-holes each having an opening on the second end surface with a diameter smaller than that of the opening on the first end surface, a tapered inside wall tapered at an angle of 1 to 10 degrees with a center axis of the through-hole and having a diameter gradually decreasing from the opening on the first end surface to an end of the tapered inside wall, and a parallel inside wall having a uniform diameter between the end of the tapered inside wall and the opening on the second end surface,
    a plurality of optical fibers each having a tip surface tilted at an angle of 3 to 10 degrees with an optical axis of the optical fiber,
    the tip surface inserted into each of the through-holes in the base plate toward the opening on the second end surface through the opening on the first end surface,
    the optical fibers each extending to the exterior of the base plate through the opening on the first end surface, and
    a plurality of collimator lenses each installed on each of the openings of the through-holes on the second end surface of the base plate to face the tip surface of each of the optical fibers,
    the diameter of the parallel inside wall of each of the plurality of through-holes opened in the base plate being 0.5 to 5 micrometers larger than a diameter of the optical fiber, and
    the through-hole being filled with a refraction index matching agent between the optical fiber in each of the through-holes and the inside wall of the through-hole and between the tip surface of the optical fiber and the collimator lens so that each of the optical fibers is secured in the through-hole.

* * * * *